Dec. 20, 1966   W. F. BROSKE   3,292,665
EXPLOSIVE TOOL
Filed Jan. 10, 1964   3 Sheets-Sheet 3
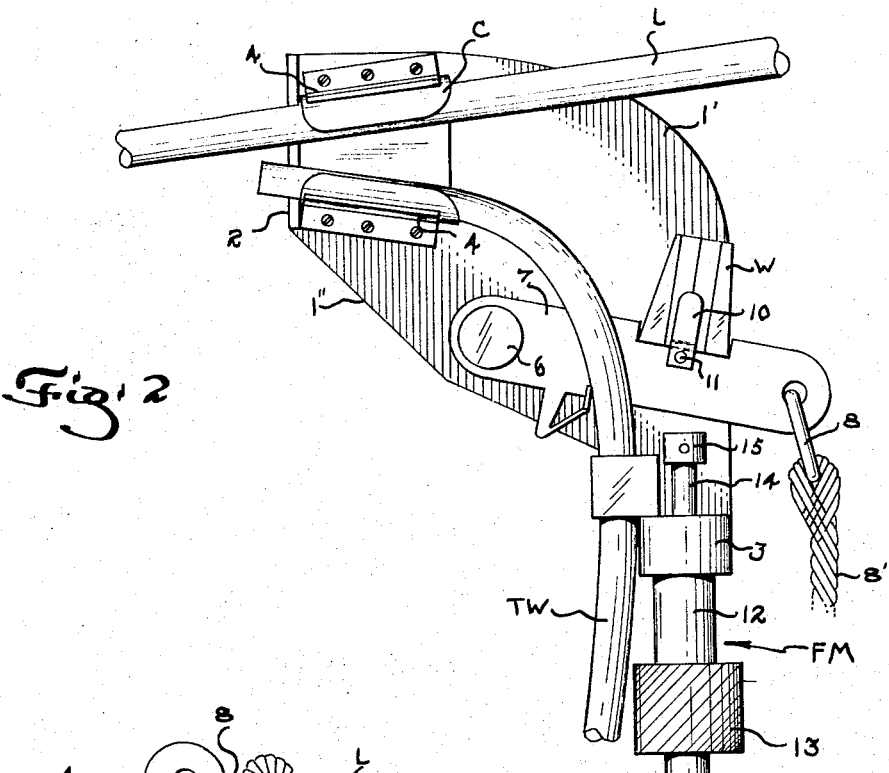
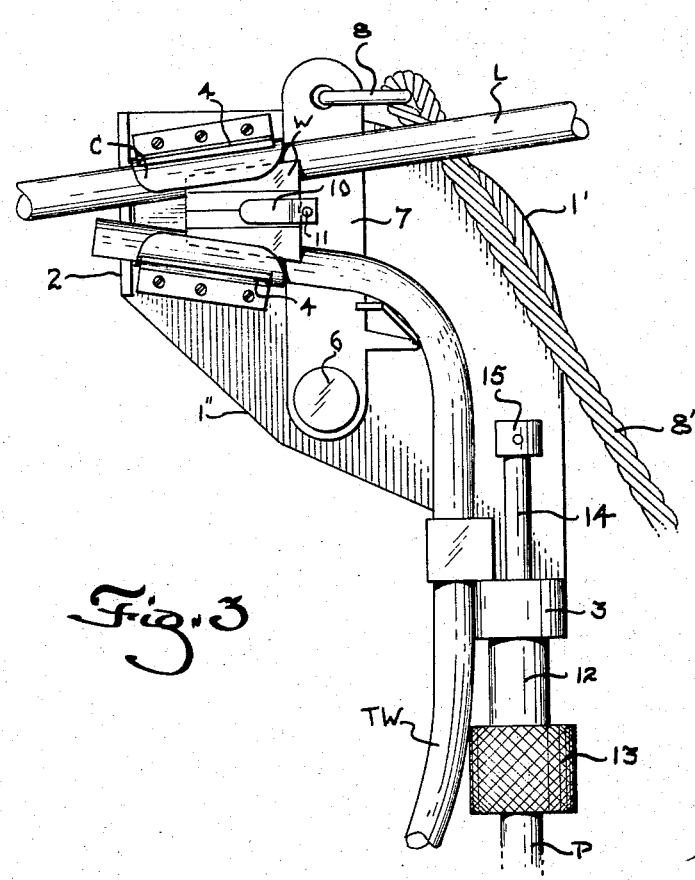
INVENTOR
WILLIAM F. BROSKE
BY
Curtis, Morris & Safford United States Patent Office 3,292,665
Patented Dec. 20, 1966

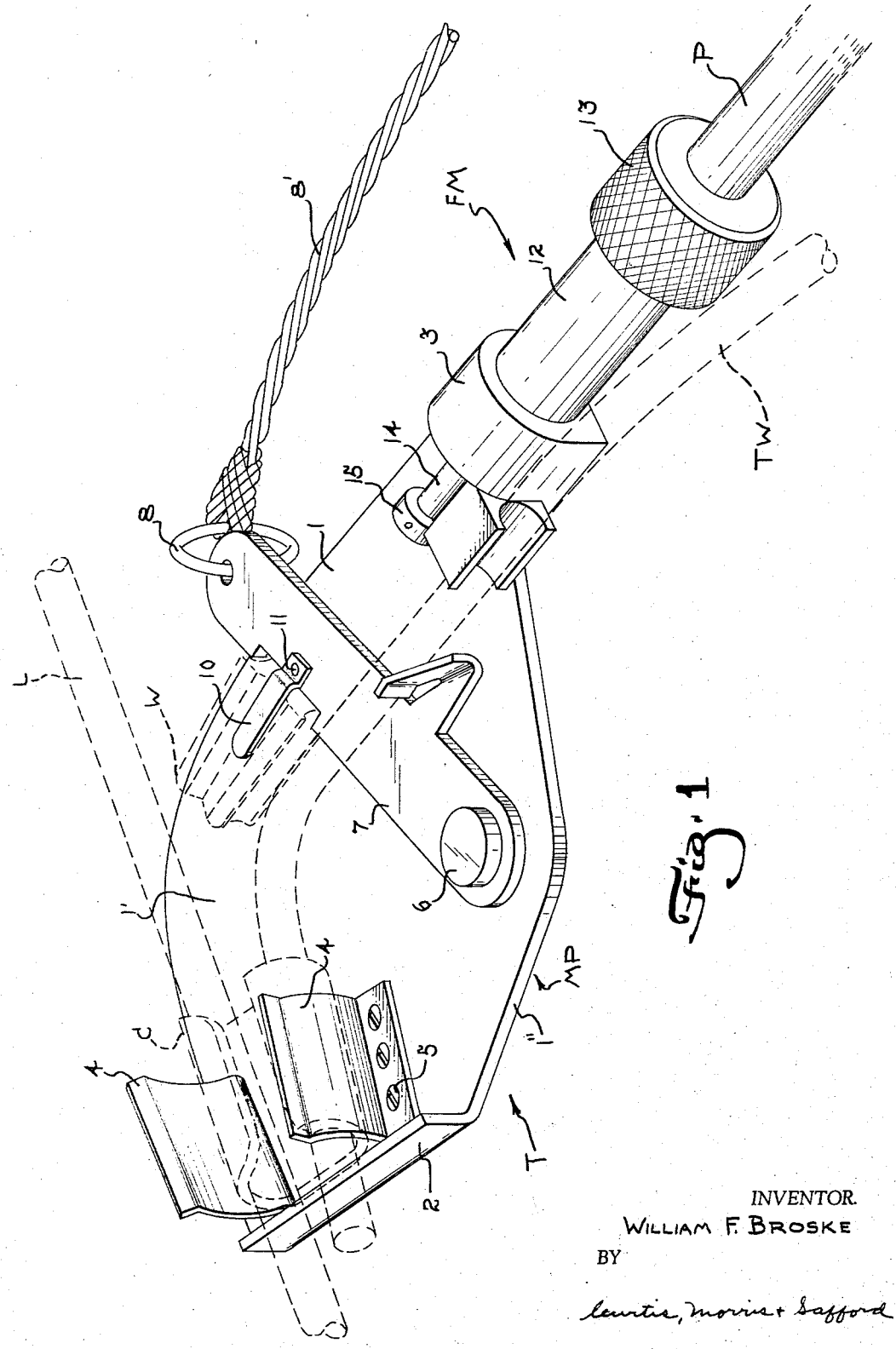

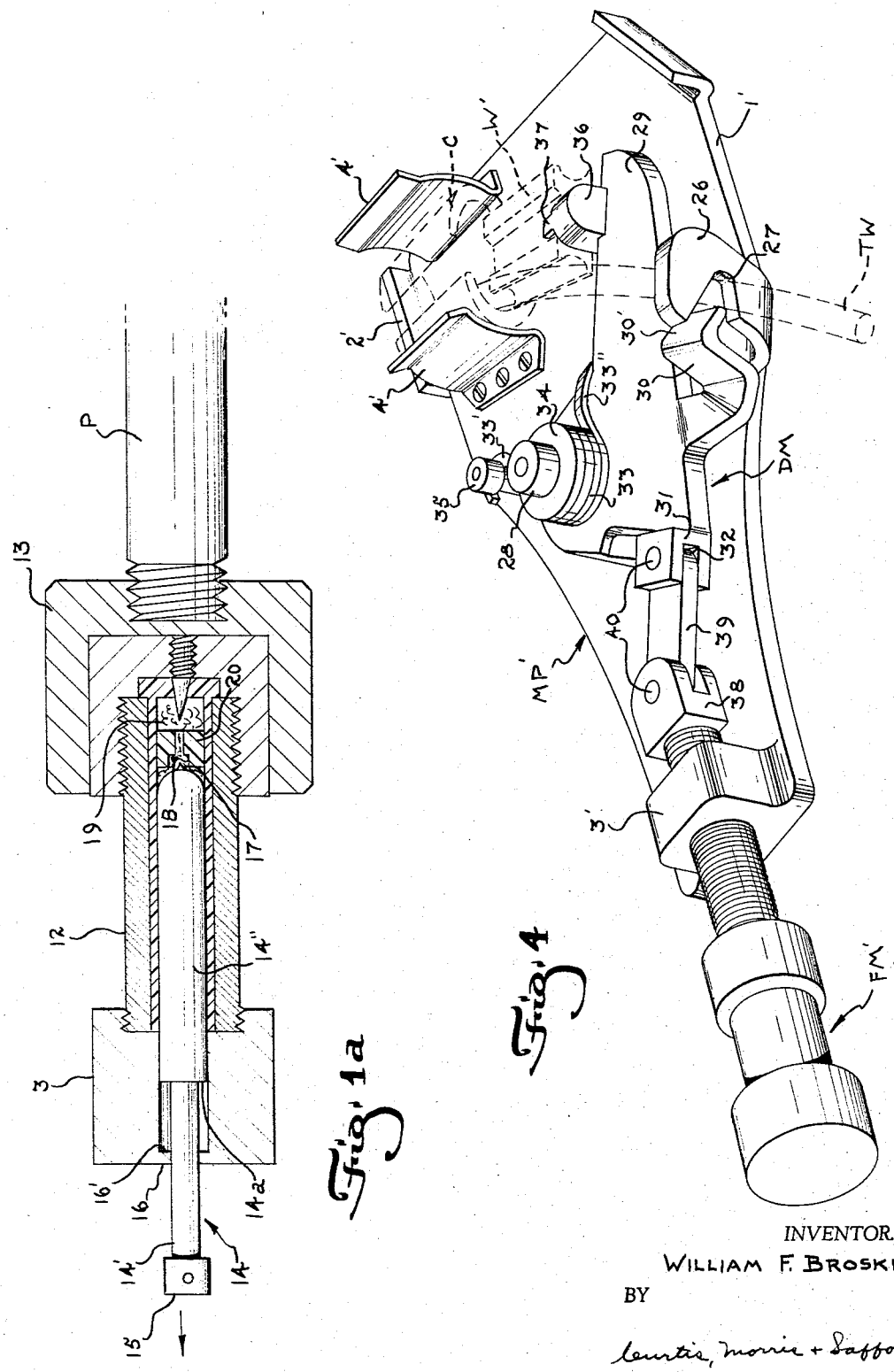

3,292,665
EXPLOSIVE TOOL
William F. Broske, Camp Hill, Pa., assignor to
AMP Incorporated, Harrisburg, Pa.
Filed Jan. 10, 1964, Ser. No. 337,055
9 Claims. (Cl. 140—113)

This invention relates to a device for connecting electrical conductors together, especially when one of them is conducting electricity of high voltage.

In the electric utility field, it has become increasingly important to provide a device that can easily connect a tap line to an existing live utility or power line, and at the same time provide a secure connection therebetween.

The connection of a tap line to a main existing utility line is generally accomplished by an operator standing on the ground or on a truck bed and using a tool at the end of a long insulated stick. One of the disadvantages of the tool used heretofore is that it weighs too much, thereby making it difficult to handle. Another disadvantage is that the tool does not make a secure connection between the main power line and the tap line.

An object of the present invention is to provide a device including a tool that can be easily handled by an operator, and hereinafter referred to as a "hot stick" tool.

Another object of the present invention is to provide a hot stick tool that is lightweight and of rugged construction.

A further object of the present invention is to provide a hot stick tool that can be easily operated.

An additional object of this invention is to provide a long stick on which the tool is mounted to raise same to the level of the existing power line, and which actuates the tool to interconnect the power and tap lines.

A still further object of this invention is to provide a hot stick tool that is explosively-operated in order to effect the interconnection between the power and tap lines without any physical strain on the part of the operator.

Still another object of the present invention is to provide a tool of simple construction with a minimum of moving parts which allows the tool to be repeatedly fired without damage thereto.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

In the drawings:

FIGURE 1 is a perspective view of a tool according to the principles of the invention;

FIGURE 1a is a fragmentary cross-sectional view showing the firing mechanism;

FIGURE 2 is a front elevational view of the tool prior to operation;

FIGURE 3 is a view similar to FIGURE 2 in an actuated position; and

FIGURE 4 is a perspective view of an alternative embodiment.

Turning now to FIGURES 1–3, there is shown a tool T comprising a mounting plate MP and a firing mechanism FM.

Mounting plate MS is preferably made of metal, such as aluminum or alloy thereof, and defines a flat plate 1 having an upturned section 2 and a threaded section 3 in which firing mechanism FM is disposed. Plate 1 has a top arcuate edge 1' and a bottom arcuate edge 1".

Adjacent upturned section 2, spring clip members 4 are mounted on plate 1 in spaced relationship by suitable means 5, such as, screws, rivets, etc. Clip members 4 hold a C-shaped connector body C in place therein.

Contiguous edge 1", there is disposed in plate 1 a pivot pin 6 on which one end of a pivot arm 7 is pivotally mounted. The other end of pivot arm 7 extends beyond edge 1' and has a ring 8 connected thereto. A rope 8' or similar suitable means is connected to ring 8 and this will be discussed hereafter.

As can be discerned, pivot arm 7 travels in an arcuate path from section 3 to clip members 4. A recessed section 9 is disposed in pivot arm 7 and has a width slightly less than that between clip members 4 so that wedge member W can be disposed therein.

A spring member 10 is mounted on pivot arm 7 intermediate recessed section 9 by a screw 11 or suitable securing means. Spring member 10 engages wedge W to maintain same within recessed section 9 prior to operation of the tool to drive the wedge within connector body C.

Firing mechanism FM is similar to that disclosed in my prior U.S. patent application, Serial No. 215,562, filed August 8, 1962, now Patent No. 3,212,534, and includes a hollow barrel 12 in which an explosive shell S is disposed and which is disclosed in U.S. Patent No. 3,007,409, in my name. Barrel 12 is threadably mounted in section 3 or in any other suitable manner, such as, by welding.

A cap 13, preferably knurled on the exterior surface, is threaded over the end of barrel 12 to permit insertion and removal of the shell. As in the above-mentioned application, cap 13 has a pin 13' on its inside surface which punctures the sealed end of the exposive shell upon force being applied to the end of cap 13.

A plunger 14 is movably mounted in barrel 12 and includes an engaging member 15 on the outer end of a first section 14'. Member 15 is larger in diameter than section 14' in order to engage the outer surface 16 of section 3 to limit the inner movement of the plunger within the barrel. Plunger 14 also includes a second section 14" of larger diameter than section 14' which moves within shell S. The intersection between sections 14' and 14" forms a surface 14a which engages inner shoulder 16' upon plunger 14 being moved away from the bottom of barrel 12 in order to limit the outer movement thereof.

A projection 17 on the inner end of section 14" engages primer 18 so as to ignite powder charge 19 below plug 20 when sufficient force is applied to cap 13.

A block 21 is located on plate 1 adjacent section 3 and has a groove 22 therein. Arm 7 has a projection 23 extending outwardly therefrom. Projection 23 has extending outwardly therefrom a member 24 which includes an engaging section 25. Block 21 and engaging section 25 define a holding means so that a tap wire TW is held thereby. Engaging section 25 is preferably resilient and block 21 may be adjustable on plate 1 to accommodate different size tap wires.

Operation.—A connector body C is placed between spring clip member 4 with on edge engaged with upturned section 2 to maintain the connector body in position. A wedge W is then placed within recessed section 9 under spring member 10. A tap wire TW is placed within connector body C and wtihin groove 22. Pivot arm 7 is then moved toward block 21 so that engaging section 25 engages the tap wire to hold same within groove 22. Cap 13 is removed from barrel 21 and a shell S is placed within the barrel.

A pole member P is mounted on cap 13 of the firing mechanism and the pole member is used to raise the tool to the level of an existing line L so that the connector body is hooked thereon as shown in FIGURE 2. The bottom of pole member P is struck thereby causing shell S to be fired.

Once the shell has been fired, plunger 14 is moved outwardly with sufficient force so that engaging member 15 engages pivot arm 7 causing it to move in an arcuate path and forcibly driving wedge W within connector body C between existing line L and tap wire TW so that a secure mechanical and electrical interconnection therebetween is effected as shown in FIGURE 3. The tool is freed from the connection and readied for another similar operation. If spring 10 maintains pivot arm 7 in engagement after the wedge has been driven into position within the connector body, a pull on rope 8' will free arm 7 therefrom.

Turning now to FIGURE 4, there is shown an alternative embodiment of the tool which comprises a mounting plate MP' and a firing mechanism FM'.

Mounting plate MP' is a flat plate 1' having an upturned section 2', threaded section 3' and spring clip members 4' similar to those of FIGURE 1. Another upturned section 26 is on plate 1' and includes a U-shaped slot 27 therein.

A driving member DM is movably mounted on plate 1' by means of a pin 28. Driving member DM includes a driving arm 29, an upturned arm 30 and a section 31 having a slot 32 therein. A spring means 33, such as, a coil spring is located around pin 28 and held in place by a washer 34. One end 33' of the spring means engages a pin 35 on plate 1' while the other end 33" engages driving member DM contiguous arm 29. Thus, spring means 33 normally maintains driving arm 29 against upturned section 26.

Driving arm 29 has a member 36 thereon which includes a projection 37 to hold a wedge W in place in order to be driven within connector body C held within spring clip members 4' and against upturned section 2'.

Upturned arm 30 has an extension 30' in alignment with groove 27 so that extension 30' engages a tap wire TW disposed within groove 27 in order to hold the tap wire in place within connector body C prior to wedge W being driven therein.

Firing mechanism FM' is the same as that of the firing mechanism in FIGURE 1a except that instead of the plunger having an engaging member 15, a bifurcated member 38 is on the outer end of the plunger. A link member 39 has each end pivotally disposed respectively in bifurcated member 38 and slot 32 by pins 40.

The tool of FIGURE 4 is the same as that of FIGURE 1 except for the fact that the driving member is returned to its normal inoperative position by spring means, a link member is pivotally connected between the firing mechanism and the driving member to provide a positive connection therebetween in order to allow the firing mechanism to be threadably moved in section 3' to move the wedge into engagement with the existing line and tap wire prior to operation and the means to hold the tap wire is slightly different. Otherwise, the operation of the tool of FIGURE 4 is similar to that of FIGURE 1 and, therefore, need not be reiterated since such would be superfluous.

It can be discerned that there has been disclosed explosively-operated tools to effect an excellent connection of a tap conductor to an energized main conductor without the operator having to climb any utility pole to accomplish same.

While the present invention is to be utilized in energized line installations, it is to be understood that it can be employed with equally satisfactory results in applying connectors to wires, rods and cables in their deenergized condition, as well as with similar members which are never intended to be energized as the connection of a secondary cable means onto an existing cable means.

It will, therefore, be appreciated that the aforementioned and other desirable objects have been achieved; however, it should be emphasized that the particular embodiments of the invention, which are shown and described herein, are intended as merely illustrative and not as restrictive of the invention.

I claim:

1. A tool for interconnecting a line member with an existing line member comprising a mounting plate means, means on said mounting plate means for holding a connector member which is adapted to engage said existing line member and in which said line member is disposed, driving means pivotally mounted on said mounting plate means, means on said driving means for holding a wedge member thereon, and explosive means on said mounting plate means for driving said driving means to drive said wedge member in said connector member between said line members.

2. A tool according to claim 1 wherein pole means are on said mounting plate means for raising said tool means to the level of said existing line member and to actuate said explosive means.

3. A tool according to claim 1 wherein spring means engage said driving means to maintain same in a normally inoperative position.

4. A tool according to claim 1 wherein linkage means are pivotally connected between said driving means and said explosive means.

5. A tool according to claim 1 wherein means are provided on said mounting plate means and said driving means to hold said line member on the tool.

6. In a tool adapted to be raised to the level of an existing line for connecting thereto another line, mounting plate means, holding means on said mounting plate means for holding a connector member, driving means pivotally mounted on said mounting plate means, another holding means on said driving means for holding a wedge member, explosive means on said mounting plate means for driving said driving member to drive said wedge member within said connector member between said lines, and pole means on said mounting plate means for raising said tool to the level of the existing line and to actuate said explosive means.

7. In a tool according to claim 6 wherein a further holding means is on said mounting means and said driving means to hold said other line within said connector member prior to said wedge member being driven therewithin.

8. In a tool according to claim 6 wherein said mounting plate means and driving means has spring means interconnected therebetween to maintain said driving means in a normally inoperative position.

9. In a tool according to claim 6 wherein said driving means and explosive means has linkage means pivotally connected therebetween.

References Cited by the Examiner

UNITED STATES PATENTS 3,212,535  10/1965  Broske _____ 140—113

CHARLES W. LANHAM, *Primary Examiner.*

R. D. GREFE, *Assistant Examiner.*